United States Patent
Futami (10) Patent No.: US 7,282,827 B2
(45) Date of Patent: Oct. 16, 2007

(54) PERMANENT MAGNET MOTOR

(75) Inventor: Toshihiko Futami, Fuji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/572,702

(22) PCT Filed: Jul. 28, 2004

(86) PCT No.: PCT/JP2004/010700

§ 371 (c)(1),
(2), (4) Date: Mar. 17, 2006

(87) PCT Pub. No.: WO2005/029678

PCT Pub. Date: Mar. 31, 2005

(65) Prior Publication Data

US 2006/0273678 A1    Dec. 7, 2006

(30) Foreign Application Priority Data

Sep. 19, 2003  (JP) ............................. 2003-327599

(51) Int. Cl.
*H02K 1/27* (2006.01)
*H02K 1/24* (2006.01)
*H02K 1/22* (2006.01)
*H02K 21/14* (2006.01)
*H02K 21/16* (2006.01)

(52) U.S. Cl. ..................... 310/156.48; 310/156.53; 310/156.54; 310/156.56; 310/156.57

(58) Field of Classification Search ........... 310/156.48, 310/156.53, 156.54, 156.56, 156.57, 261
See application file for complete search history.

(56) References Cited

U.S. PATENT DOCUMENTS 5,369,325 A * 11/1994 Nagate et al. ......... 310/156.54

(Continued)

FOREIGN PATENT DOCUMENTS

DE          19851883       *   5/2000

(Continued)

OTHER PUBLICATIONS

International Search Report for PCT/JP2004/010700.

(Continued)

*Primary Examiner*—Tran Nguyen
(74) *Attorney, Agent, or Firm*—Finnegan, Henderson, Farabow, Garrett & Dunner, L.L.P.

(57) ABSTRACT

A permanent magnet motor has permanent-magnet-holding slots 5 formed in those parts of a rotor core 2A which correspond to sides of an approximately regular polygon centered on an axis of the rotor core 2A, permanent magnets 4 inserted in the respective permanent-magnet-holding slots, and four or more radially elongated slits 6 arranged apart from each other along each of the permanent-magnet-holding slots on an outer core outside the permanent-magnet-holding slots, characterized in that at a radially outer end, the slits are spaced approximately equally while at a radially inner end, spacing between the slits is reduced with increasing distance from a center of each permanent magnet, with the spacing at the center being the largest.

6 Claims, 6 Drawing Sheets

U.S. PATENT DOCUMENTS

| | | | |
|---|---|---|---|
| 5,672,926 A * | 9/1997 | Brandes et al. | 310/181 |
| 6,525,442 B2 * | 2/2003 | Koharagi et al. | 310/156.48 |
| 6,717,314 B2 * | 4/2004 | Horst et al. | 310/156.43 |
| 6,727,623 B2 * | 4/2004 | Horst et al. | 310/156.57 |
| 6,891,298 B2 * | 5/2005 | Gary | 310/156.53 |
| 6,917,133 B2 * | 7/2005 | Koharagi et al. | 310/156.57 |

FOREIGN PATENT DOCUMENTS

| | | | |
|---|---|---|---|
| JP | 1-247786 | | 10/1989 |
| JP | 6189481 | * | 7/1994 |
| JP | 8-182267 | | 7/1996 |
| JP | 9131009 | * | 5/1997 |
| JP | 2803456 | | 7/1998 |
| JP | 11-187597 | | 7/1999 |
| JP | 11-252840 | | 9/1999 |
| JP | 2001-37186 | | 2/2001 |
| JP | 2001037127 A | * | 2/2001 |
| JP | 2002-84690 | | 3/2002 |
| JP | 2005245148 A | * | 9/2005 |
| WO | WO2004051824 A1 | * | 6/2004 |

OTHER PUBLICATIONS

International Preliminary Report on Patentability issued by the International Bureau of WIPO on Jun. 29, 2006, for International Application No. PCT/JP2004/010700.

* cited by examiner

PERMANENT MAGNET MOTOR

BACKGROUND OF THE INVENTION

1. Field of the Invention

The present invention relates to a permanent magnet motor equipped with a rotor consisting of a plurality of permanent magnets buried in a rotor core.

2. Related Art

Figure 11:
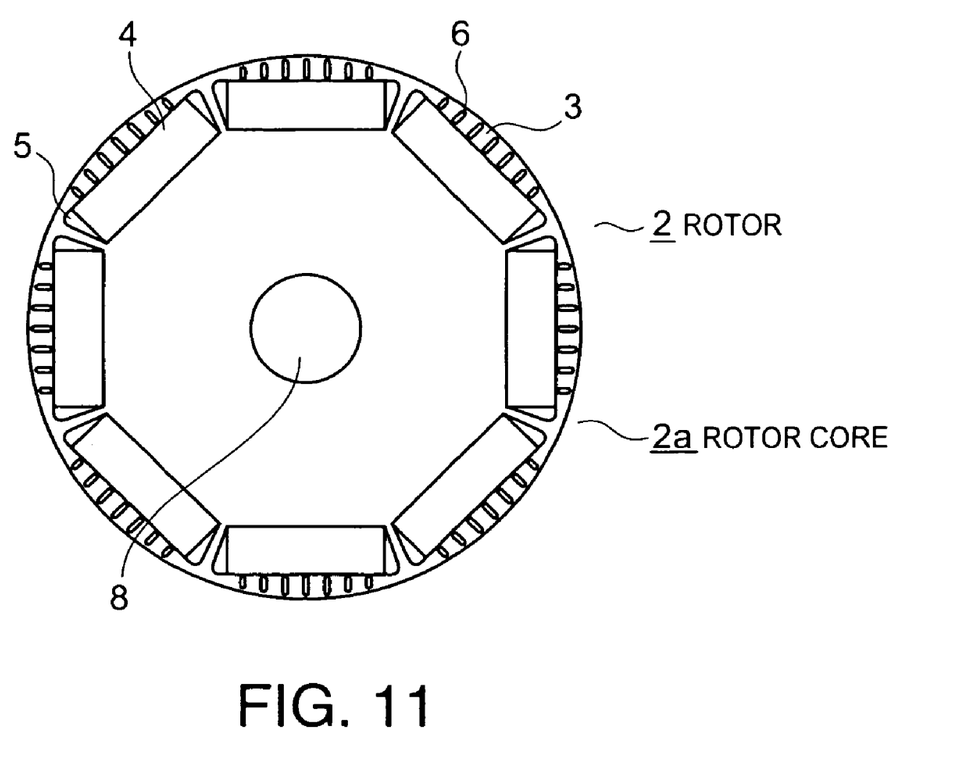
FIG. 11 is a side view showing an end of a rotor of a permanent magnet motor as viewed along the insertion direction of a rotating shaft of the rotor before the rotating shaft is inserted.

There is disclosed a permanent magnet motor whose demagnetization resistance and efficiency has been improved by burying permanent magnets in a rotor core (see, for example, Japanese Patent Laid-Open No. 11-187597). FIG. 11 is a side view showing an end of a rotor of the permanent magnet motor as viewed along the insertion direction of a rotating shaft of the rotor before the rotating shaft is inserted. In FIG. 11, a rotor 2 consists of a rotor core 2a and rotating shaft (not shown), where the rotor core 2a is a generally pillar-shaped stack of steel plates cylindrical in outline. Near its outer circumference, the rotor core 2a has permanent-magnet-holding slots 5 corresponding to sides of an approximately regular octagon and each of the permanent-magnet-holding slots 5 contains a permanent magnet 4. The permanent magnets 4 are arranged in such a way that the S pole and N pole alternate with each other. A plurality of radially elongated slits 6 are arranged apart from each other along each of the permanent-magnet-holding slots 5 on an outer core 3 outside the permanent-magnet-holding slots 5. A rotating-shaft hole 8 is provided in the center of the rotor core 2a to accept the rotating shaft.

With the conventional permanent magnet motor described above, the slits 6 in the rotor core 2a are spaced at equal intervals to lead in and out magnetic flux of the permanent magnets 4 radially as well as to prevent magnetic flux (hereinafter referred to as armature reaction flux) generated by stator winding current from being bent along the circumference of the outer core 3.

However, when the plurality of slits 6 are arranged at equal intervals, radial magnetic flux distribution in the permanent magnets 4 has a trapezoidal profile. Consequently, geometric positional relationship between stator and rotor produces high cogging torque, increasing vibration.

Also, voltage induced by stator windings has a harmonic-rich distorted waveform, resulting in not only increased noise, but also increased core loss, which in turn results in reduced efficiency.

Furthermore, if the stator is driven by 3-phase sine wave AC current, only a fundamental wave component contribute effectively to torque while harmonic components produce torque ripple which increases vibration and noise.

SUMMARY OF THE INVENTION

In order to solve the above-described problems, an object of the present invention is to provide a highly efficient permanent magnet motor which can reduce armature reaction flux, improve magnetic flux distribution in an outer core, and thereby reduce noise and vibration.

To achieve the above object, the present invention provides a permanent magnet motor set forth in claims 1 to 5.

Claim 1 of the present invention sets forth a permanent magnet motor comprising a rotor equipped with a rotor core which is a generally pillar-shaped stack of steel plates, permanent-magnet-holding slots formed in those parts of the rotor core which correspond to sides of an approximately regular polygon centered on an axis of the rotor core, permanent magnets inserted in the respective permanent-magnet-holding slots, and a plurality of radially elongated slits arranged apart from each other along each of the permanent-magnet-holding slots on an outer core outside the permanent-magnet-holding slots, characterized in that at a radially outer end, the slits are spaced approximately equally while at a radially inner end, spacing between the slits is reduced with increasing distance from a center of each permanent magnet, with the spacing at the center being the largest.

Claim 2 of the present invention sets forth the permanent magnet motor according to claim 1, characterized in that if sides of the permanent magnets are made to correspond to a base of a sine wave, the spacing between the slits at the radially inner end is proportional to height of the sine wave.

Claim 3 of the present invention sets forth the permanent magnet motor according to claim 2, characterized in that the rotor has $2n$ magnetic poles and a stator has $3n$ teeth each of which has a conductor wound in a concentrated manner, where n is a positive integer; and sides of the permanent magnets correspond to the base of the sine wave when contracted toward the center.

Claim 4 of the present invention sets forth the permanent magnet motor according to claim 1, characterized in that core width between a radially outer end of the slits and an outer circumference of the rotor core is larger at the center of the permanent magnets than at both ends.

Claim 5 of the present invention sets forth the permanent magnet motor according to claim 1, characterized in that core width between a radially outer end of the permanent-magnet-holding slots and a radially inner end of the slits as well as core width between a radially inner end of the slits and an outer circumference of the rotor core are 1 to 3 times thickness of the steel plates.

The present invention reduces armature reaction flux, improves magnetic flux distribution in an outer core, and thus provides a highly efficient permanent magnet with reduced noise and vibration.

DETAILED DESCRIPTION OF THE INVENTION

Hereafter, the present invention will be described more specifically with reference to embodiments shown in the drawings.

Figure 1:
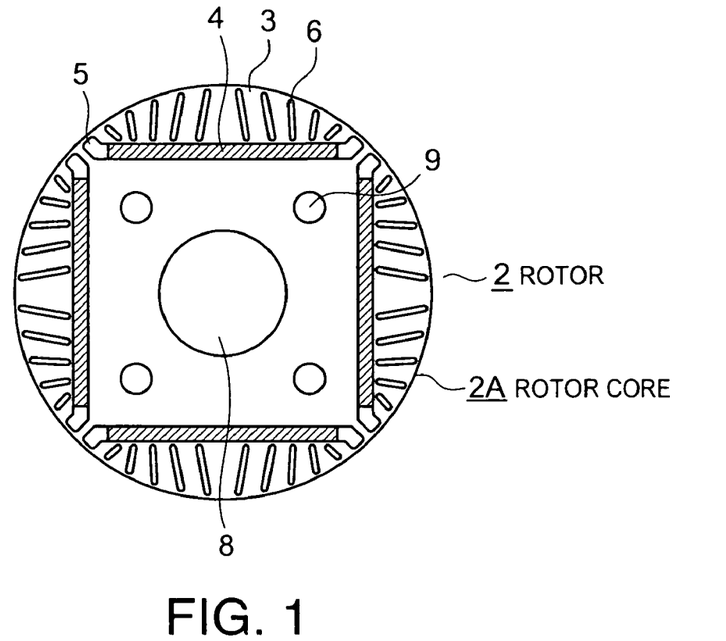
FIG. 1 is a side view showing an end of a rotor of a permanent magnet motor according to a first embodiment of the present invention as viewed along the insertion direction of a rotating shaft before the rotating shaft is inserted.

FIG. 1 is a side view showing an end of a rotor of a permanent magnet motor according to a first embodiment of the present invention as viewed along the insertion direction of a rotating shaft before the rotating shaft is inserted. In the figure, the same components as the conventional motor in FIG. 11 are denoted by the same reference numerals as the corresponding components in FIG. 11, and description thereof will be omitted. A rotor 2 consists of a rotor core 2A and a rotating shaft (not shown), where the rotor core 2A is a generally pillar-shaped stack of steel plates cylindrical in outline.

The rotor core 2A has permanent-magnet-holding slots 5 formed at locations corresponding to sides of an approximately regular quadrangle near the outer circumference of the rotor core 2A. A permanent magnet is buried in each of the permanent-magnet-holding slots 5. A plurality of radially elongated slits 6, for example, ten slits 6, are arranged apart from each other along each of the permanent-magnet-holding slots 5 on an outer core 3 outside the permanent-magnet-holding slots 5. A rotating-shaft hole 8 is provided in the center of the rotor core 2A to accept a rotating shaft and through-bolt holes 9 are provided around the rotating-shaft hole 8.

According to this embodiment, at the radially outer end, the slits 6 are spaced approximately equally along the outer circumference of the rotor core 2A while at the radially inner end, spacing between the slits is reduced with increasing distance from the center of each permanent magnet 4, with the spacing at the center of the permanent magnet 4 being the largest.

Since the slits 6 are arranged as described above, magnetic flux of the permanent magnets 4 passing through pole cores between the slits 6 is approximately proportional to the spacing at that end of the slits 6 which is nearer to the permanent magnets 4. Consequently, distribution of the permanent magnets' (4) magnetic flux passing through the outer core 3 is reduced with increasing distance from the center of each permanent magnet 4, with the spacing at the center of the permanent magnet 4 being the largest when viewed in the circumferential direction. This increases effective magnetic flux which contributes to torque generation, produces less harmonic magnetic flux and core loss than in the case of trapezoidal magnetic flux distribution, and reduces cogging torque which causes vibration.

Thus, the first embodiment reduces armature reaction flux using the plurality of slits, improves the magnetic flux distribution in the outer core, and thereby provides a highly efficient permanent magnet with reduced noise and vibration.

Figure 2:
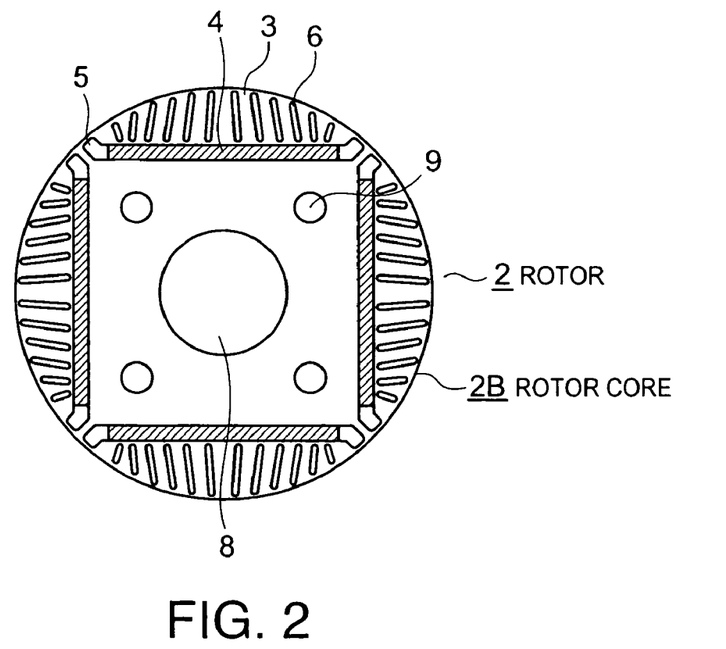
FIG. 2 is a side view showing an end of a rotor of a permanent magnet motor according to a second embodiment of the present invention as viewed along the insertion direction of a rotating shaft before the rotating shaft is inserted.

FIG. 2 is a side view showing an end of a rotor of a permanent magnet motor according to a second embodiment of the present invention as viewed along the insertion direction of a rotating shaft before the rotating shaft is inserted. In the figure, the same components as the first embodiment in FIG. 1 are denoted by the same reference numerals as the corresponding components in FIG. 1, and description thereof will be omitted. A rotor core 2B has twelve slits 6 arranged apart from each other along each of the permanent-magnet-holding slots 5. At the radially outer end, the slits 6 are spaced approximately equally along the outer circumference of the rotor core 2B. At the radially inner end, a side of each permanent magnet is made to correspond to the base of a sine wave and the slits are arranged such that the spacing between them will be proportional to the height of the sine wave.

Figure 3:
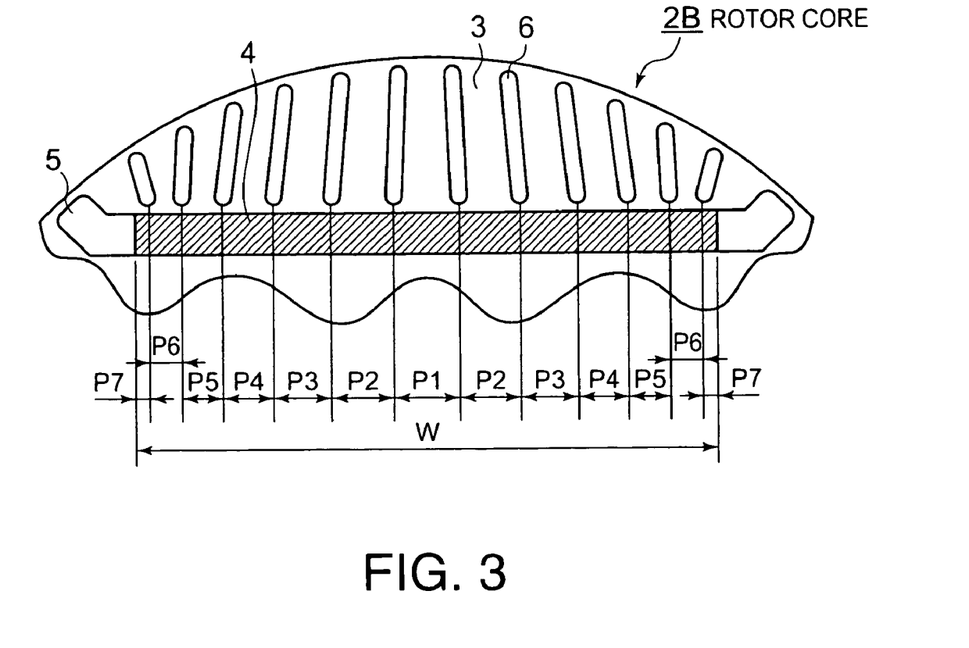
FIG. 3 is a partially enlarged view illustrating, in detail, spacing at the radially inner end of slits formed in an outer core of the rotor core shown in FIG. 2.
Figure 4:
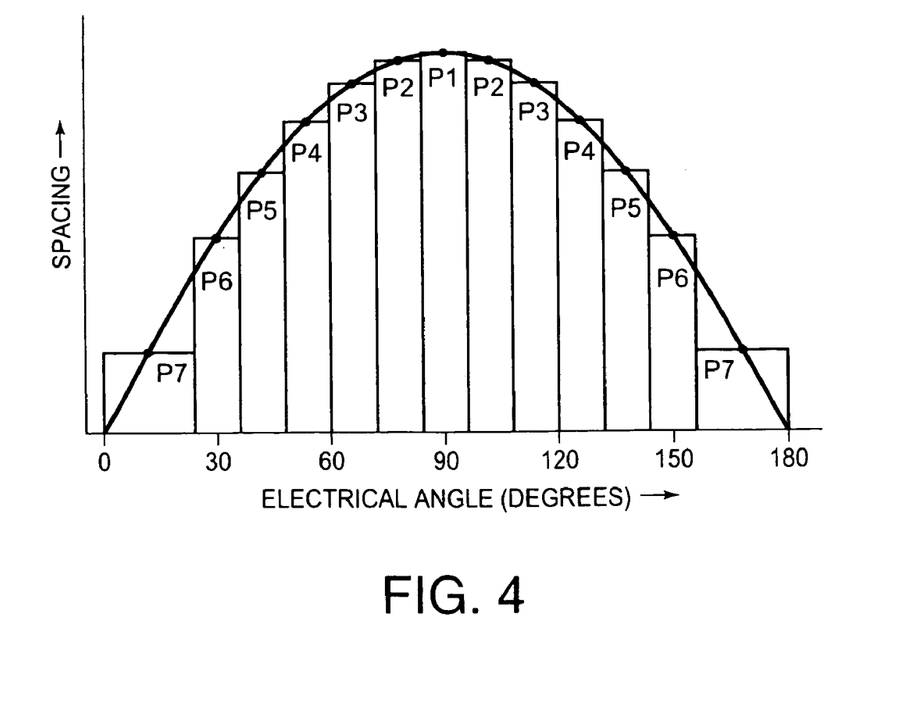
FIG. 4 is a waveform chart used to determine the spacing at the radially inner end of the slits formed in the outer core of the rotor core shown in FIG. 2.

FIG. 3 is a partially enlarged view illustrating, in detail, spacing at the radially inner end of slits 6 formed in the outer core 3 outside the permanent magnet 4 in the rotor core 2B. The spacing at the longitudinal center of the permanent magnet 4 is denoted by P1 and spacings P2, P3, . . . P6, and P7 are determined in such a way that they will be reduced with increasing distance from the center. As shown in FIG. 4, the base of a sine wave (half wave) equal to 180 degrees in electrical angle is brought into correspondence with the length W of the permanent magnet 4, the sine wave is divided into 15 parts along the electrical angle, the height of the center part is denoted by P1 and the heights of the outer parts are denoted by P2, P3, . . . P6, and P7 in sequence, and the spacings P1 to P7 at the radially inner end of the slits 6 are determined in such a way as to be proportional to the heights P1 to P7. Thus, a relationship P1>P2>P3>P4>P5>P6>P7 holds true. Also, the magnetic flux is proportional to the spacings P1 to P7, resulting in a magnetic flux distribution close to the sine wave.

Thus, the second embodiment reduces armature reaction flux using the plurality of slits, further improves the magnetic flux distribution in the outer core, and thereby provides a highly efficient permanent magnet with reduced noise and vibration.

Figure 5:
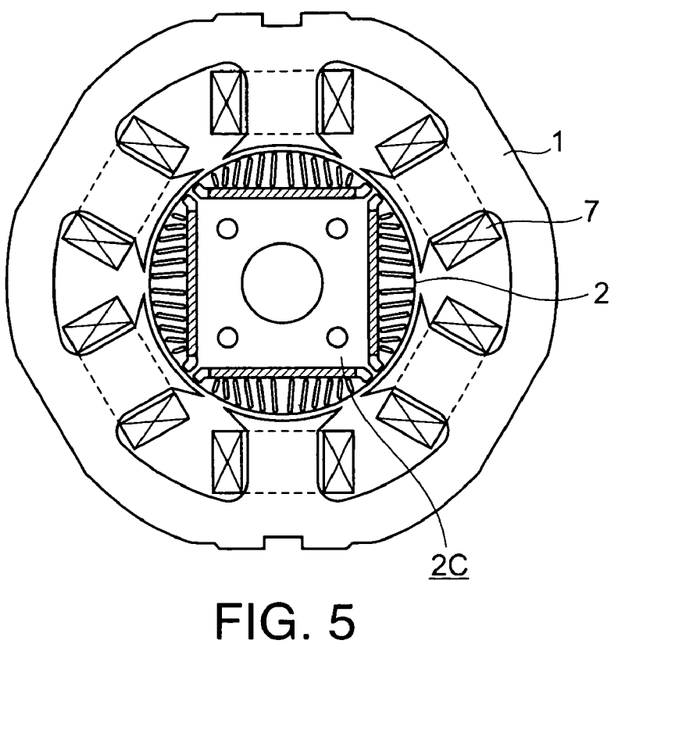
FIG. 5 is a side view showing an end of a rotor and stator of a permanent magnet motor according to a third embodiment of the present invention.

FIG. 5 is a side view showing an end of a rotor and stator of a permanent magnet motor according to a third embodiment of the present invention. In particular, it employs, as the rotor 2, a rotor core 2C similar to the rotor core 2B shown in FIG. 3. The spacings P1 to P7 at the radially inner end of the slits 6 are determined here assuming that the rotor 2 has 2n (=4) magnetic poles while a stator 1 has 3n (=6) teeth each of which has a conductor 7 wound in a concentrated manner, where n is a positive integer (2 in this case) and assuming that sides of the permanent magnets 4, when contracted toward the center, correspond to the base of the sine wave shown in FIG. 4.

If there is a relationship of 2n:3n between the number of rotor (2) poles and number of stator (1) teeth, angular intervals between the poles of the rotor 2 are smaller than angular intervals between the teeth of the stator 1, and thus the teeth in each phase of the stator 1 cannot receive all the magnetic flux from one pole of the rotor 2.

Figure 6:
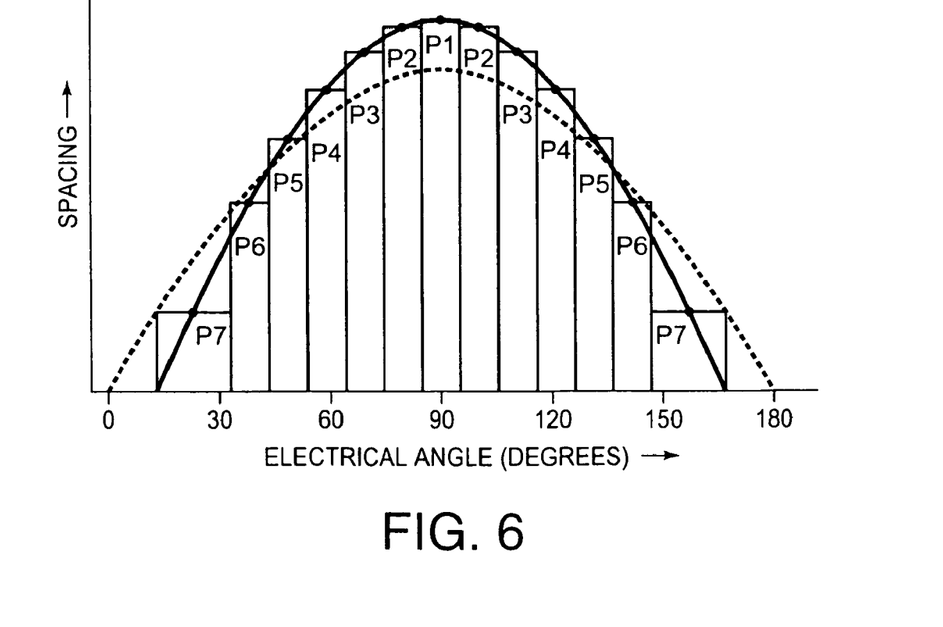
FIG. 6 is a waveform chart used to determine the spacing at the radially inner end of slits formed in an outer core of the rotor core shown in FIG. 5.
Figure 7:
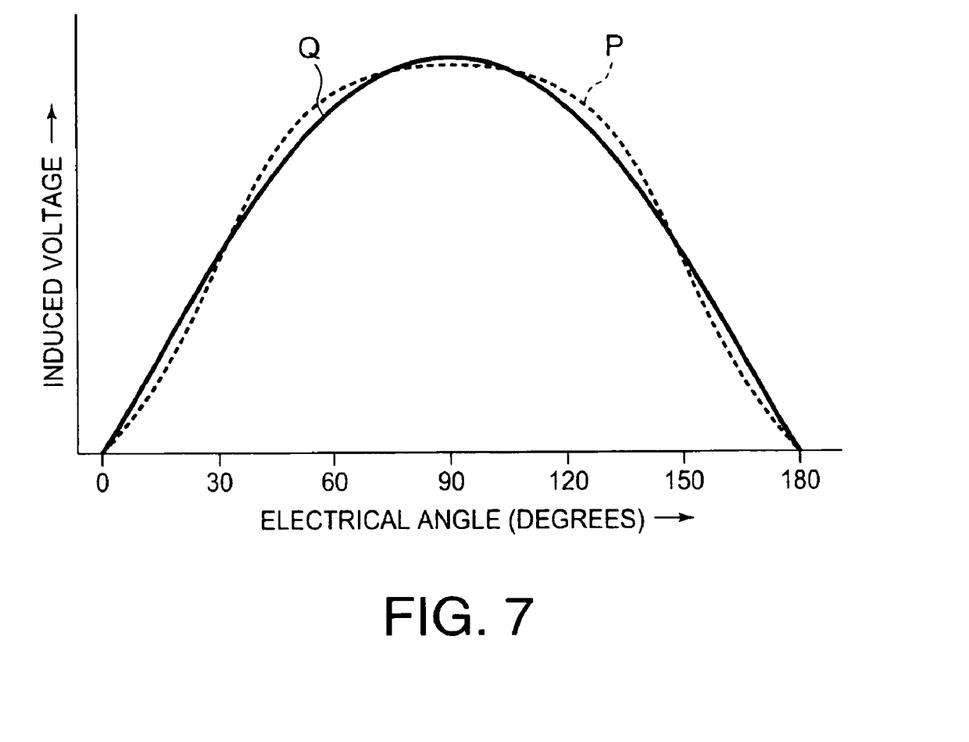
FIG. 7 is a distribution chart of magnetic flux generated in the rotor core shown in FIG. 5.

FIG. 6 is an explanatory diagram illustrating how to solve this problem. The rotor core 2C is configured as follows: instead of putting the entire length W of the permanent magnet 4 in correspondence with the base of a sine wave directly, a sine wave with the same area as the sine wave shown in FIG. 4 is created in a segment obtained by contracting the permanent magnet 4 inward by a predetermined length from its opposite ends, and spacings P1 to P7 at the radially inner end of the slits 6 are determined in such a way as to be proportional to heights P1 to P7 obtained by equally dividing the created sine wave. Consequently, as shown in FIG. 7, compared to the magnetic flux distribution according to the second embodiment represented by a broken curve P, the magnetic flux distribution according to the third embodiment is closer to the sine wave, rising sharply and intensifying in the midsection as indicated by a solid curve Q. Thus, the third embodiment provides a better induced voltage waveform than the second embodiment, and further improves the motor efficiency.

Thus, the third embodiment reduces armature reaction flux using the plurality of slits, further improves the magnetic flux distribution in the outer core, and thereby provides a highly efficient permanent magnet motor with reduced noise and vibration.

Figure 8:
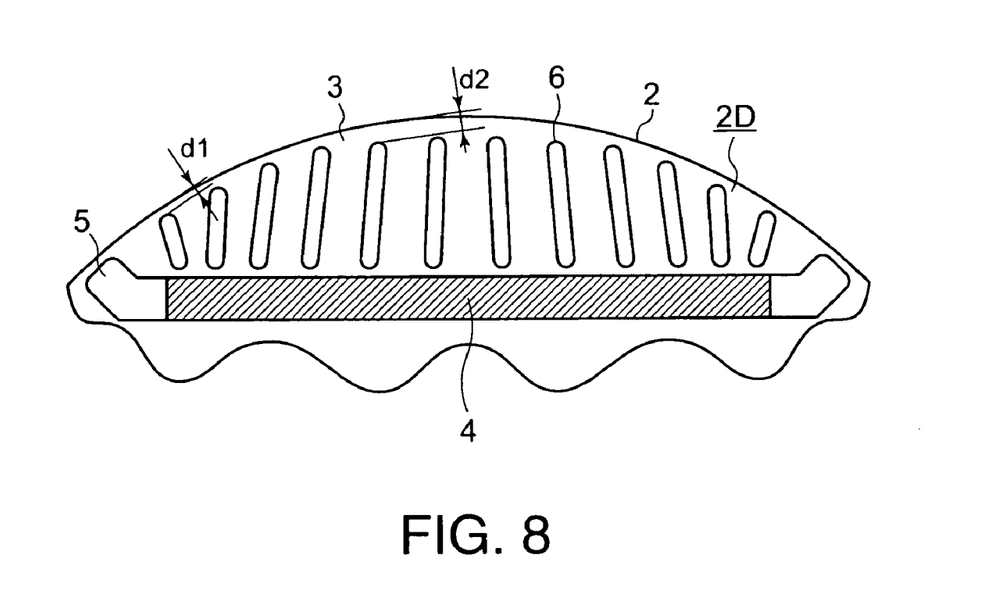
FIG. 8 is a partially enlarged side view showing an end of a rotor of a permanent magnet motor according to a fourth embodiment of the present invention as viewed along the insertion direction of a rotating shaft.

FIG. 8 is a partially enlarged side view showing an end of a rotor of a permanent magnet motor according to a fourth embodiment of the present invention as viewed along the insertion direction of a rotating shaft. In the figure, the same components as in FIG. 3 are denoted by the same reference numerals as the corresponding components in FIG. 3, and description thereof will be omitted. In a rotor core 2D, core width between the radially outer end of the slits 6 and outer circumference of the rotor core 2D is larger (e.g., d2) at the center of the permanent magnet than at locations distant from the center (e.g., d1). The reason will be explained below.

Figure 9:
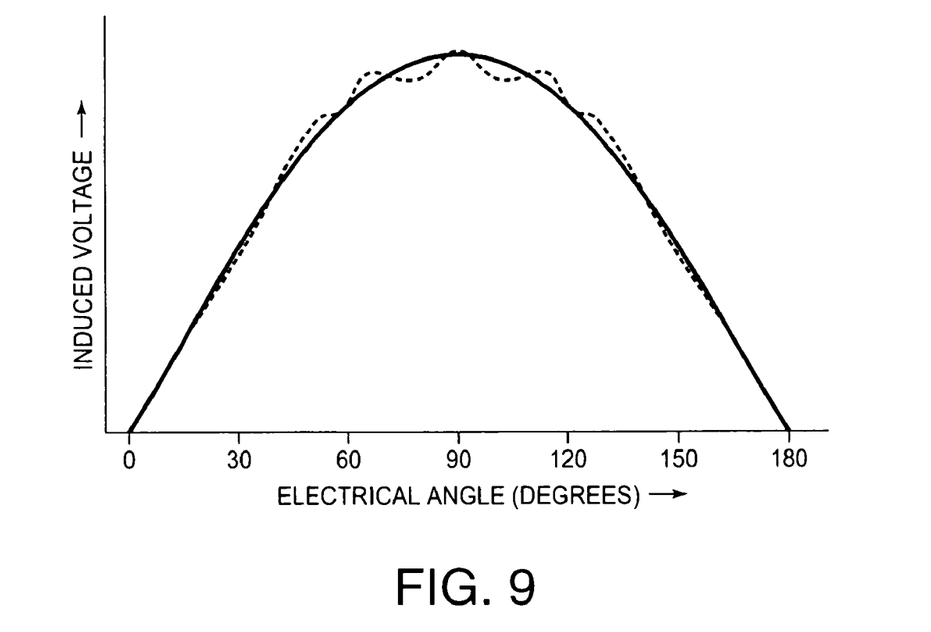
FIG. 9 is an induced voltage waveform chart illustrating operation of the fourth embodiment shown in FIG. 8.

If the core width between the radially outer end of the slits 6 and the outer circumference of the rotor core were uniform, rippling, i.e., pulsation with a small amplitude, might occur in the midsection of the induced voltage waveform where the magnetic flux is intense, as shown in FIG. 9. Maybe this is because the core width between the radially outer end of the slits 6 and the outer circumference of the rotor core is too small for the intensity of the magnetic flux, resulting in high magnetic reluctance. By making the core width between the radially outer end of the slits 6 and the outer circumference of the rotor core 2D larger (d2) near the center of the pole where rippling occurs prominently in the magnetic flux distribution than in the other part (d1), the rotor core 2D according to this embodiment prevents rippling in the induced voltage waveform without ruining the effect of magnetic flux distribution control performed by means of the slits 6.

Thus, the fourth embodiment reduces armature reaction flux using the plurality of slits, further improves the magnetic flux distribution in the outer core, and thereby provides a highly efficient permanent magnet motor with reduced noise and vibration.

Figure 10:
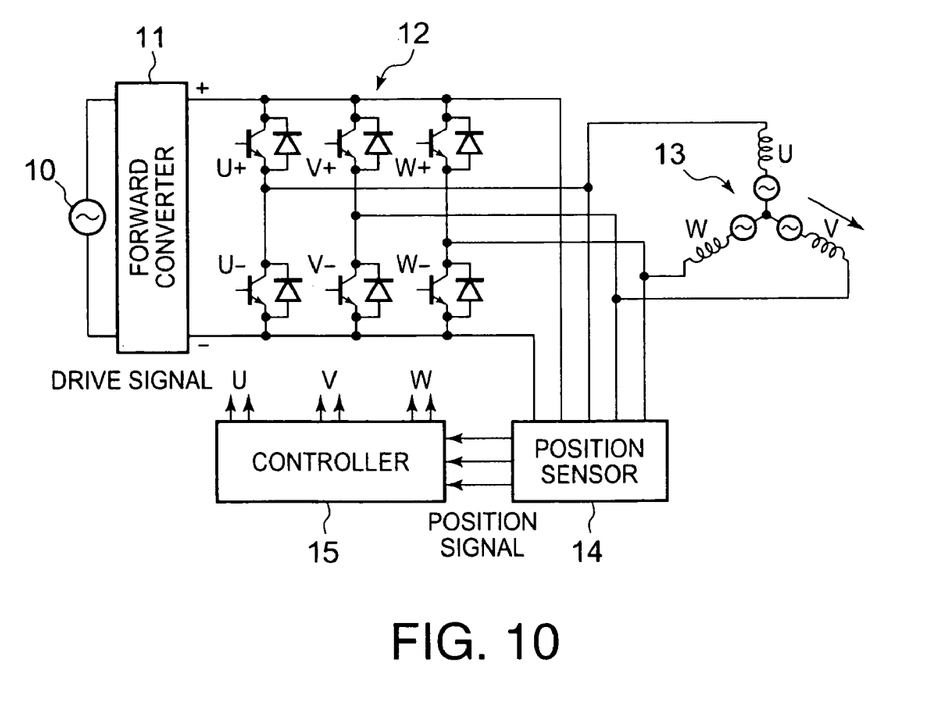
FIG. 10 is a diagram showing a drive circuit which drives the permanent magnet motor of each embodiment.

FIG. 10 shows a drive circuit which drives the permanent magnet motor. An alternating current from an AC power supply 10 is converted into a direct current by a converter 11. The DC output is reconverted into an alternating current of a desired frequency by an inverter 12 capable of producing variable-frequency output and the resulting alternating current is supplied to a permanent magnet motor 13 (hereinafter referred to as the motor 13). A position sensor 14 detects rotor position of the motor 13 based on terminal voltage of the motor 13 and sends it as a position signal to a controller 15. Using the position signal, the controller 15 controls the inverter 12 in such a way that output frequency of inverter 12 will be synchronized with rotational frequency of the motor 13. Incidentally, the motor 13 is practically a 3-phase synchronous motor and the inverter 12 is configured to be a 3-phase bridge type accordingly. U, V, and W-phase positive arms are denoted by U+, V+, and W+, respectively, while negative arms are denoted by U−, V−, and W−. The illustrated circuit configuration constitutes a DC commutatorless motor. Incidentally, the method for detecting the rotor position of a motor based on the terminal voltage of the motor is known as a sensorless method or indirect position detection method.

As is well known, in each phase winding of the motor 13, a pair of a positive arm of one phase and a negative arm of another phase turn on and the other arms remain off at each instant. As the arm to be turned on is switched among the three phases in sequence, a desired 3-phase output is given to the motor 13 from the inverter 12. This makes it possible to drive the stator by supplying 3-phase sine wave AC current.

It is desirable to minimize the core width between the radially outer end of the permanent-magnet-holding slots 5 and radially inner end of the slits 6 as well as the core width between the radially outer end of the slits 6 and an outer circumference of the rotor core from the viewpoint of preventing the magnetic flux from bending along the circumference. On the other hand, it is desirable to provide some allowance when blanking the steel plates. To reduce the rippling, appropriately, the core widths are 1 to 3 times the thickness of the magnetic steel plate.

Although in the above embodiments, permanent magnets are buried in those parts of the rotor core which correspond to the sides of a regular quadrangle centered on the axis of the rotor core, the present invention is not limited to this. The present invention is applicable to almost any permanent magnet motor whose rotor consists of permanent magnets buried in those parts of the rotor core which correspond to the sides of an approximately regular polygon centered on the axis of the rotor core.

Furthermore, although in the above embodiments, ten to twelve slits 6 are formed in the outer core 3, the present invention is applicable to any permanent magnet motor which has four or more slits 6, considering that slits are arranged in relation to a sine wave.

What is claimed is:

1. A permanent magnet motor comprising a rotor equipped with a rotor core which is a generally pillar-shaped stack of steel plates, permanent-magnet-holding slots formed in those parts of the rotor core which correspond to sides of an approximately regular polygon centered on an axis of the rotor core, permanent magnets inserted in the respective permanent-magnet-holding slots, and a plurality of radially elongated slits arranged apart from each other along each of the permanent-magnet-holding slots on an outer core outside the permanent-magnet-holding slots, characterized in that at a radially outer end, the slits are spaced approximately equally while at a radially inner end, spacing between the slits is reduced with increasing distance from a center of each permanent magnet, with the spacing at the center being the largest.

2. The permanent magnet motor according to claim 1, characterized in that if sides of the permanent magnets are made to correspond to a base of a sine wave, the spacing between the slits at the radially inner end is proportional to height of the sine wave.

3. The permanent magnet motor according to claim 2, characterized in that the rotor has $2n$ magnetic poles and a stator has $3n$ teeth each of which has a conductor wound in a concentrated manner, where n is a positive integer; and sides of the permanent magnets correspond to the base of the sine wave when contracted toward the center.

4. The permanent magnet motor according to claim 1, characterized in that core width between a radially outer end of the slits and an outer circumference of the rotor core is larger at the center of the permanent magnets than at both ends.

5. The permanent magnet motor according to claim 1, characterized in that core width between a radially outer end of the permanent-magnet-holding slots and a radially inner end of the slits as well as core width between a radially outer end of the slits and an outer circumference of the rotor core are 1 to 3 times thickness of the steel plates.

6. The permanent magnet motor according to claim 1, characterized in that at least four slits are arranged along each of the permanent magnet slots.

\* \* \* \* \*